US012612046B2

(12) United States Patent
Kobashi et al.

(10) Patent No.: US 12,612,046 B2
(45) Date of Patent: Apr. 28, 2026

(54) VEHICLE DRIVABLE AREA DETECTION SYSTEM CONFIGURED TO DETECT DATA REPRESENTING VERTICAL OBSTACLES AND A DRIVABLE AREA FROM A POINT CLOUD AND PROVIDE THE DATA TO A DRIVER ASSIST COMPONENT

(71) Applicant: NISSAN NORTH AMERICA, INC., Franklin, TN (US)

(72) Inventors: Atsuhide Kobashi, Santa Clara, CA (US); Christopher Ostafew, Mountain View, CA (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 1097 days.

(21) Appl. No.: 17/683,166

(22) Filed: Feb. 28, 2022

(65) Prior Publication Data

US 2023/0271616 A1     Aug. 31, 2023

(51) Int. Cl.
| | |
|---|---|
| *G06V 20/56* | (2022.01) |
| *B60W 40/06* | (2012.01) |
| *G01S 17/34* | (2020.01) |
| *G01S 17/89* | (2020.01) |
| *G01S 17/931* | (2020.01) |

(52) U.S. Cl.
CPC ............. *B60W 40/06* (2013.01); *G01S 17/34* (2020.01); *G01S 17/89* (2013.01); *G01S 17/931* (2020.01); *B60W 2420/408* (2024.01); *B60W 2552/50* (2020.02)

(58) Field of Classification Search
CPC ........ G06V 20/58; G06V 20/56; G01S 17/34; G01S 17/89; G01S 17/931; G01S 7/4802;
B60W 40/06; B60W 2420/408; B60W 2552/50; B60W 2554/60; B60W 30/143; B60W 50/14; B60W 60/001
USPC .................................................. 382/104, 199
See application file for complete search history.

(56) References Cited

U.S. PATENT DOCUMENTS

| | | | |
|---|---|---|---|
| 10,377,310 | B2 | 8/2019 | Tan et al. |
| 10,493,952 | B1 | 12/2019 | Schwie et al. |
| 10,576,972 | B2 | 3/2020 | Gokan et al. |
| 10,611,374 | B2 | 4/2020 | Sato et al. |
| 10,683,008 | B2 | 6/2020 | Pawlicki et al. |
| 10,699,457 | B2 | 6/2020 | Mohan et al. |
| 10,852,418 | B2 | 12/2020 | Wodrich et al. |

(Continued)

*Primary Examiner* — Chad Dickerson
(74) *Attorney, Agent, or Firm* — Spencer Fane, LLP

(57) ABSTRACT

A vehicle drivable area detection system includes a vehicle, at least one 3D sensor and an electronic controller. The at least one 3D sensor is installed to the vehicle and is configured to scan and capture data using laser imaging, detection and distance ranging relative to the vehicle. The data collected represents ground surface features including vertical obstacles, non-vertical obstacles and a drivable area proximate the vehicle within a line-of-sight of the 3D sensor. The electronic controller is installed within the vehicle and is electronically connected to the 3D sensor and at least one driver assist component. The electronic controller conducts the following: a vertical obstacle extraction from the data; terrain estimating from the data; curb detection from the data; and generating a plurality of data elements identifying vertical obstacles including curbs and the drivable area to the at least one driver assist component.

16 Claims, 12 Drawing Sheets

(56)                    References Cited

U.S. PATENT DOCUMENTS

| | | | |
|---|---|---|---|
| 10,988,120 B2 | 4/2021 | Gomes | |
| 10,988,139 B2 | 4/2021 | Fukushige et al. | |
| 11,030,818 B1 | 6/2021 | Wang et al. | |
| 11,052,925 B2 | 7/2021 | Gotou et al. | |
| 11,221,622 B2 | 1/2022 | Schwie et al. | |
| 2011/0205363 A1* | 8/2011 | Suzuki | G06V 20/588 |
| | | | 348/148 |
| 2020/0339109 A1* | 10/2020 | Hong | G06F 11/3698 |
| 2020/0377089 A1* | 12/2020 | Fukushige | B60W 30/12 |
| 2021/0019536 A1* | 1/2021 | Motoyama | G05D 1/0214 |
| 2021/0271249 A1* | 9/2021 | Kobashi | G06V 20/58 |

* cited by examiner

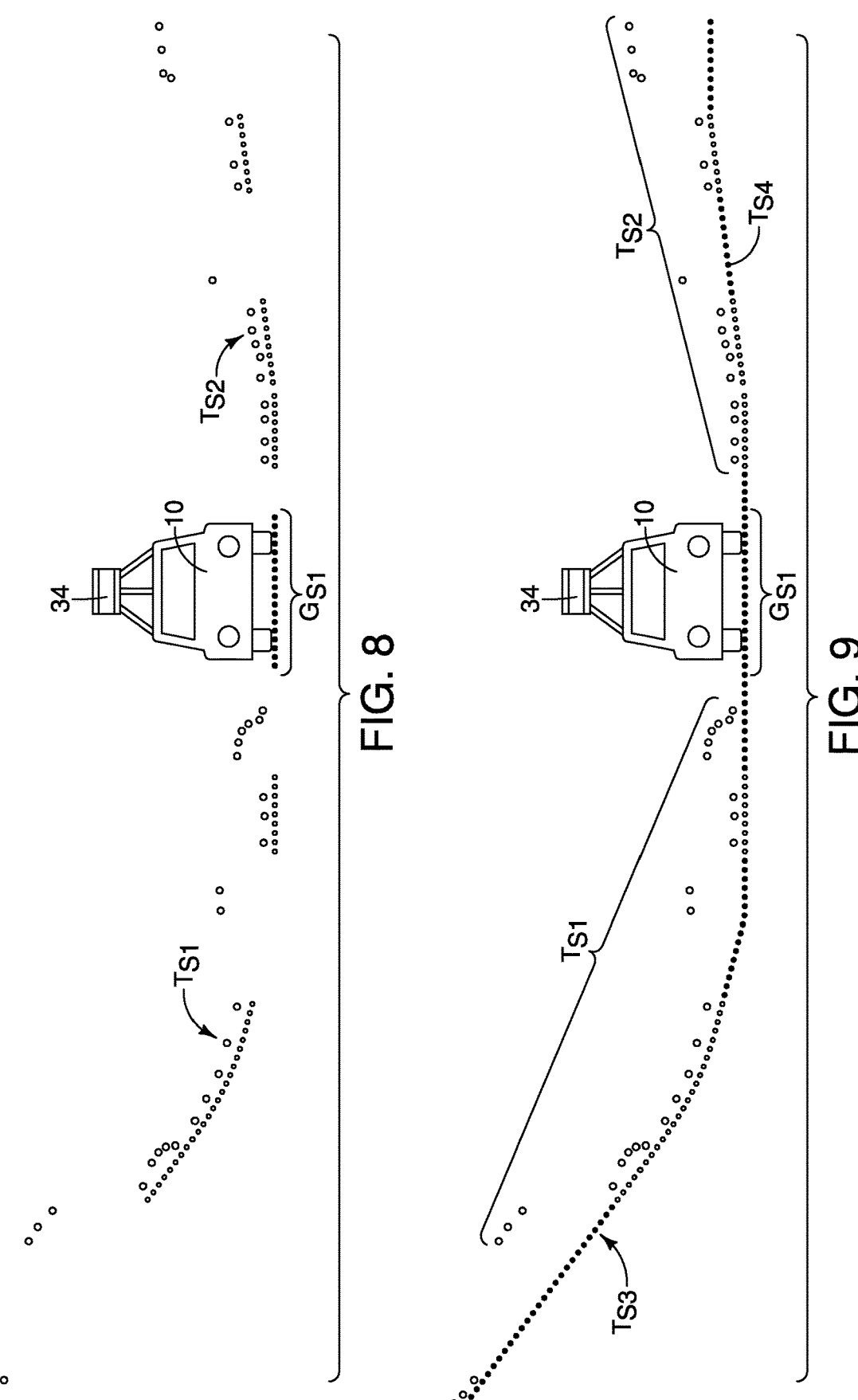

N_N

34

10

T_02

N2

N1

T_01

T_02

T_01

VEHICLE DRIVABLE AREA DETECTION SYSTEM CONFIGURED TO DETECT DATA REPRESENTING VERTICAL OBSTACLES AND A DRIVABLE AREA FROM A POINT CLOUD AND PROVIDE THE DATA TO A DRIVER ASSIST COMPONENT

BACKGROUND

Technical Field

The present disclosure generally relates to a vehicle drivable area detection system. More specifically, the present disclosure relates to a vehicle drivable area detection system that evaluates data points from a 3D sensor that scans objects and ground areas around a vehicle and outputs distance, direction and vertical height for each data point reflected off an object surface.

Background Information

Detecting physical features like curbs, speed bumps, potholes, and other physical obstructions in the areas around a vehicle is both a taxing and critical task for a driver. It is further complicated by environmental conditions, such as darkness at night, inclement weather conditions and driver limitations, such as poor eyesight and/or obstructions such as an A-pillar, a B-pillar and other structures of a vehicle body. Detection of such features is not possible by radar. Detection of such features is not consistently possible by cameras because 3D scene understanding is only possible if the surface has non-repeating features detectable by computer vision and object identification techniques. Further, detection of such features by a Machine Learning is difficult to validate for applications across the globe.

SUMMARY

One object of the present disclosure is to convert 3D sensor data into a digital rendering of surface portions of scanned objects, terrain, curbs, speed bumps, and other non-drivable or limited-drivable features around a vehicle without the use of object or shape recognition techniques.

In view of the state of the known technology, one aspect of the present disclosure is to provide a vehicle with a drivable area detection system that includes at least one 3D sensor installed to the vehicle and being configured to scan and capture data using laser imaging, detection and distance ranging relative to the vehicle. The data represents ground surface features including vertical obstacles, non-vertical obstacles and a drivable area proximate the vehicle within a line-of-sight of the 3D sensor. An electronic controller is installed within the vehicle and is electronically connected to the 3D sensor and at least one driver assist component. The electronic controller conducting the following: a vertical obstacle extraction from the data; terrain estimation from the data; curb detection from the data; and generating a plurality of data elements identifying vertical obstacles including curbs and the drivable area to the at least one driver assist component.

BRIEF DESCRIPTION OF THE DRAWINGS

Referring now to the attached drawings which form a part of this original disclosure:

FIG. 8 is yet another two-dimensional schematic view of the vehicle and the 3D sensor showing the data points of the point cloud after the first evaluation by the electronic controller where identified vertical groups of data points are temporarily removed from the point cloud with the electronic controller beginning to conduct a second evaluation of data focusing on ground points in the point cloud in accordance with the first embodiment;

FIG. 9 is another two-dimensional schematic view of the vehicle and the 3D sensor showing the data points of the point cloud after the second evaluation by the electronic controller showing an estimation of the ground surface or terrain around the vehicle with remaining groups of data points of the point cloud in accordance with the first embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
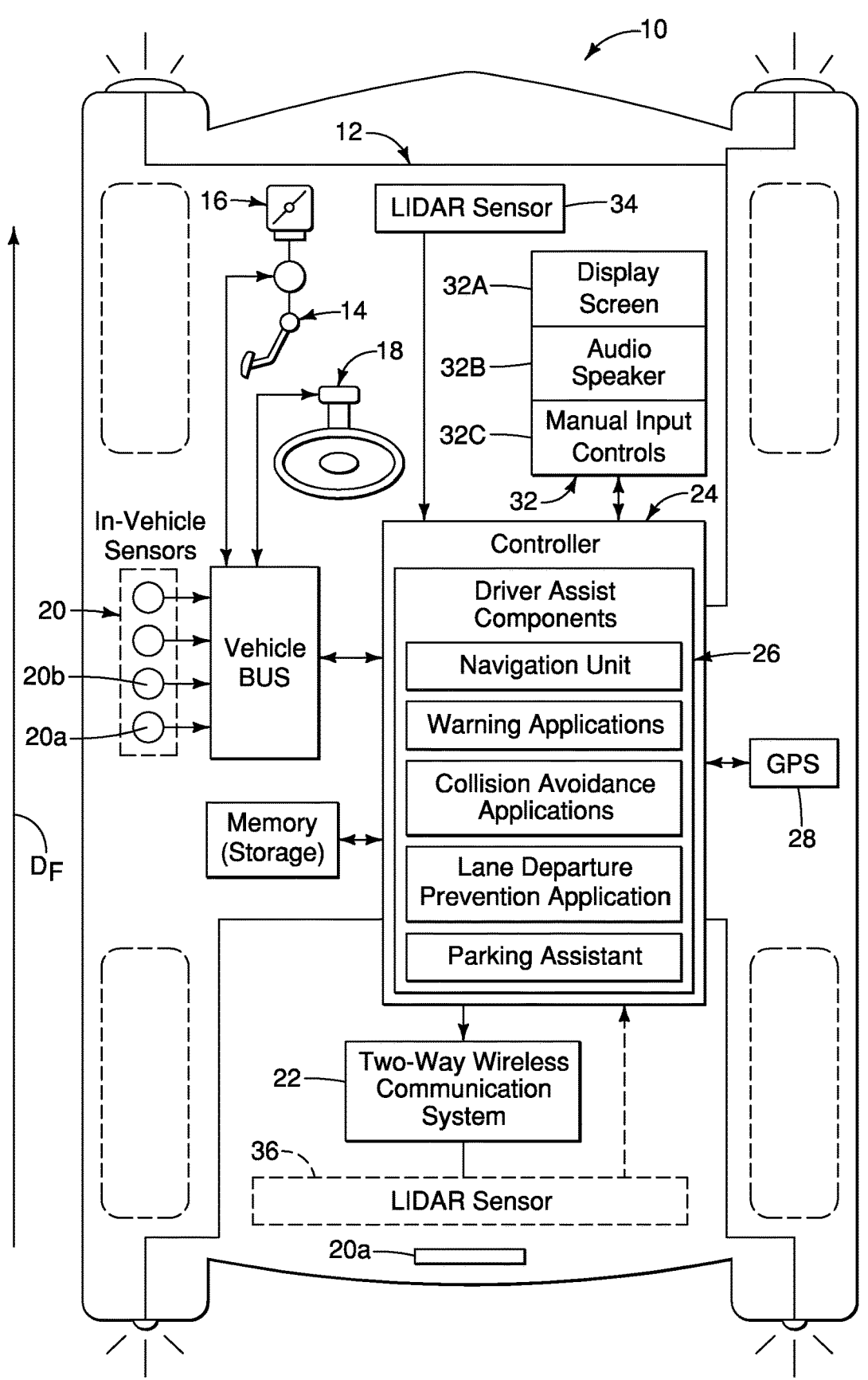
FIG. 1 is a schematic top view of a vehicle that includes an electronic controller and at least one 3D sensor connected to the electronic controller, the electronic controller being connected to or including a plurality of driver assist applications in accordance with a first embodiment.

Referring initially to FIG. 1, a vehicle 10 is illustrated in accordance with a first embodiment. The vehicle 10 can be any of a variety of vehicle designs, including a sedan, a coupe, an SUV (sports utility vehicle), a van, a pickup truck or a commercial vehicle. The vehicle 10 includes, among other features and components, a passenger compartment (not shown), a vehicle drivable area detection system 12, a braking system 14, an accelerator 16 connected to an engine (not shown) and a steering system 18. The vehicle 10 further includes a plurality of sensors 20, an optional two-way wireless communication system 22, an electronic controller 24, a plurality of driver assist components 26, a GPS 28, a display 32, a first 3D sensor 34 (a LIDAR device) and an optional second 3D sensor 36 (a second LIDAR device).

The vehicle drivable area detection system 12 is described further herein below. The braking system 14, the accelerator 16 and the steering system 18 are all conventional vehicle components that are manually operated by a vehicle operator (not shown). Each of the braking system 14, the accelerator

16 and the steering system 18 are also configured to by electronically operated by one or more of the driver assist components 26 via the electronic controller 24, as is described further herein below.

The plurality of sensors 20 can include at least sonar/radar sensors 20a installed to forward and/or rearward areas of the vehicle 10, in a conventional manner. The plurality of sensors 20 can further include a speed sensor 20b connected to the engine (not shown) and/or the transmission (not shown) or the wheels of the vehicle 10 for sensing current speed of the vehicle 10. Each of the plurality of sensors 20 is further connected to the electronic controller 24 such that measurements and detected conditions from the plurality of the sensors 20 can be evaluated by the electronic controller 24 as needed or desired.

The optional two-way wireless communication system 22 is configured for communications with other vehicles, internet communications, communication with traffic control towers and/or satellite communications in a conventional manner. The driver assist components 26 are described further herein below.

The GPS 28 and the display 32 are conventional features installed to the vehicle 10 in a conventional manner.

The first 3D sensor 34 is, for example, a LIDAR device that includes one or a plurality of lasers that emit light and then measure the time for reflected light to return. LIDAR devices are configured such that there are approximately 10-25 scans per second and a corresponding number of point clouds of data points representing returned reflections, each reflection defining a data point. It should be understood that there are a variety of commercially available LIDAR devices, some operating at 100 Hz and some as fast as 400 Hz. The first 3D sensor 34 can alternatively be one of these other commercially available LIDAR devices. A plurality of data points collected by the LIDAR device form a point cloud. Each point in the point cloud corresponds a small surface portion of an object that has been scanned. Each data point includes distance, direction and height of the small surface portion of the object that relative to the LIDAR device. Since the first 3D sensor 34 is mounted to the vehicle 10, all data points of the point cloud collected by the first 3D sensor 34 are measurements made relative to the vehicle 10. The first 3D sensor 34 can alternatively be a plurality of first 3D sensors installed, for example, at spaced apart locations along the front bumper assembly of the vehicle 10. For example, there can be six 3D sensors installed to the front bumper. Still further, the first 3D sensor 34 can be a FMCW (frequency modulated continuous wave) LIDAR device that, instead of sending out a pulse of light, outputs a continuous laser beam (not a pulse) with a continuously changing optical frequency. By comparing and processing the optical frequency of the reflected beam with the frequency when it was sent out, the electronic controller 24 can determine the distance as well as a Doppler velocity for that particular data point.

Figure 18:
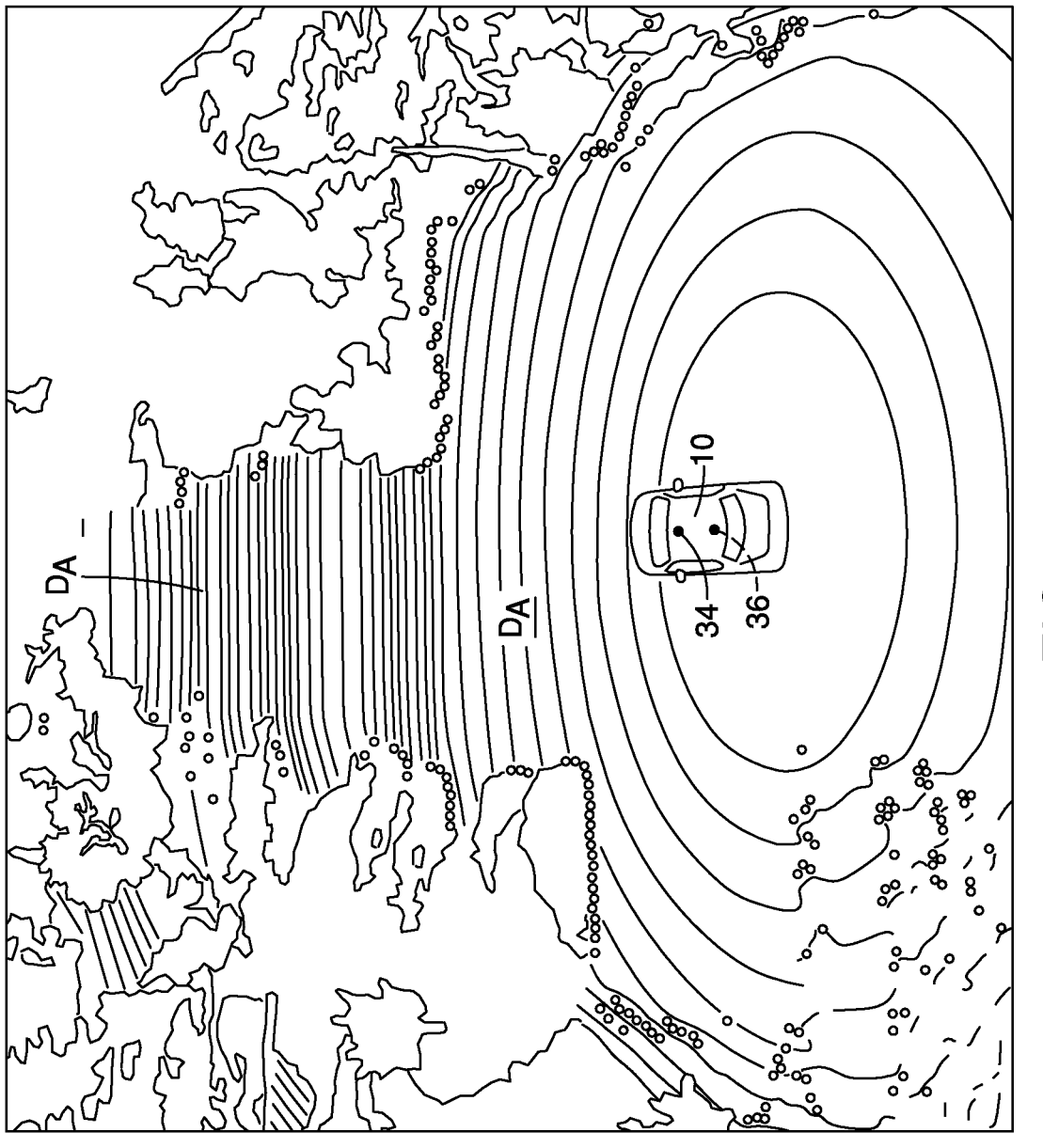
FIG. 18 is a three-dimensional perspective view of the digital data points of the data cloud after evaluation by the electronic controller showing drivable areas and data points representing curbs, objects and obstacles that represent non-drivable areas in accordance with the first embodiment.

The first 3D sensor 34 (a LIDAR device) is further configured to scan areas forward and along lateral sides of the vehicle 10. Specifically, the laser(s) and optical detectors or mirrors within the LIDAR device scan relative, for example, a vertical axis and scanning side-to-side with a scanning sweep of approximately 180 degrees or close to 180 degrees, as shown in FIG. 18. Further, during the movement of the laser(s) and optical detectors within the LIDAR device multiple data points are collected with each degree of the 180 degree scan. Further, with the vehicle 10 in motion, many point clouds are collected are collected each second of operation of the first 3D sensor 34. The data points collected by the first 3D sensor 34 therefore can assembly a plurality of point cloud per second. It should be understood from the drawings and the description herein that it is also possible to have a single 3D sensor (a LIDAR device) capable of scanning 360 degrees about the vehicle 10. The first 3D sensor 34 can alternatively be a LIDAR device that scans 360 degrees about the vehicle 10.

The first 3D sensor 34 is preferably installed to the vehicle at a high location of the vehicle 10, such as the roof of the vehicle 10, or just forward of the rearview mirror (not shown) at the top of a windshield (not shown) of the vehicle 10. If an optional second 3D sensor 36 is employed, it is preferably installed to a rearward location of the vehicle, such as the rear of the roof (not shown) of the vehicle 10 or other elevated area of a rearward portion of the vehicle 10. The optional second 3D sensor 36 is also a LIDAR device, as described above. As with the first 3D sensor 34, the second 3D sensor 36 can alternatively be a plurality of second 3D sensors installed, for example, at spaced apart locations along the rear bumper assembly of the vehicle 10.

The vehicle drivable area detection system 12 of the present invention includes at least the first 3D sensor 34 (a LIDAR device), the electronic controller 24 and at least one of the plurality driver assist components 26.

The electronic controller 24 preferably includes a micro-computer with a point cloud processing and drivable area detection system control program that processes point cloud data from LIDAR devices controls the plurality driver assist components 26, as discussed below. The electronic controller 24 can also include other conventional components such as an input interface circuit, an output interface circuit, and storage devices (memory) such as a ROM (Read Only Memory) device and a RAM (Random Access Memory) device. The microcomputer of the electronic controller 24 is programmed to control the first 3D sensor 34 and process point cloud data received therefrom. The memory circuit stores processing results and control programs such as ones for driver assist component operation that are run by the processor circuit. The electronic controller 24 is operatively coupled to the driver assist components 26, the first 3D sensor 34, the braking system 14, the accelerator 16 and the steering system 18 in a conventional manner. The internal RAM of the electronic controller 24 stores statuses of operational flags and various control data. The electronic controller 24 is capable of selectively controlling any of the components of the plurality driver assist components 26 and the drivable area detection system 12 in accordance with the control program.

The electronic controller 24 is configured to operate the 3D sensor 34 causing it to scan and capture data using laser imaging up to 100 times per second, detecting height, direction and distance relative to the vehicle 10. As mentioned above, the data points in each point cloud collected by the 3D sensor 34 represent ground surface features including vertical obstacles, non-vertical obstacles and a drivable area or areas proximate the vehicle 10 within a line-of-sight of the 3D sensor 34.

More specifically, the electronic controller 24 (installed within the vehicle 10) is electronically connected to the 3D sensor 34. During operation of the 3D sensor 34, the electronic controller 24 receives the plurality of point clouds from the 3D sensor 34 and thereafter evaluates and processes the received data in a manner depicted in FIGS. 2 and 3 and demonstrated in FIGS. 4-20 to create drivable area data points that are provided to, for example, one or more of the plurality of driver assist components 26, as described further below. The processing operations conducted by the electronic controller 24 on the point cloud can generally be broken down into at least four basic evaluations of the data points in the point cloud: a vertical obstacle extraction from the data; terrain estimation from the data; curb detection from the data; and generating a plurality of data elements identifying vertical obstacles including curbs and the drivable area to the at least one driver assist component, and providing them to at least one of the driver assist components 26.

It should be understood that the vehicle 10 can be in motion while the first 3D sensor 34 is operating. Therefore, a plurality of cloud points are collected for processing in order to clearly define obstacles around the vehicle 10 with collections of data points. The speed sensor 20b of the vehicle 10 is connected to the electronic controller 24 such that each point cloud received by the electronic controller 24 is correlated by speed to distance traveled. Alternatively, the electronic controller 24 can be connected to an odometer (not shown) of the vehicle 10 to correlate point clouds to distance traveled.

Figure 2:
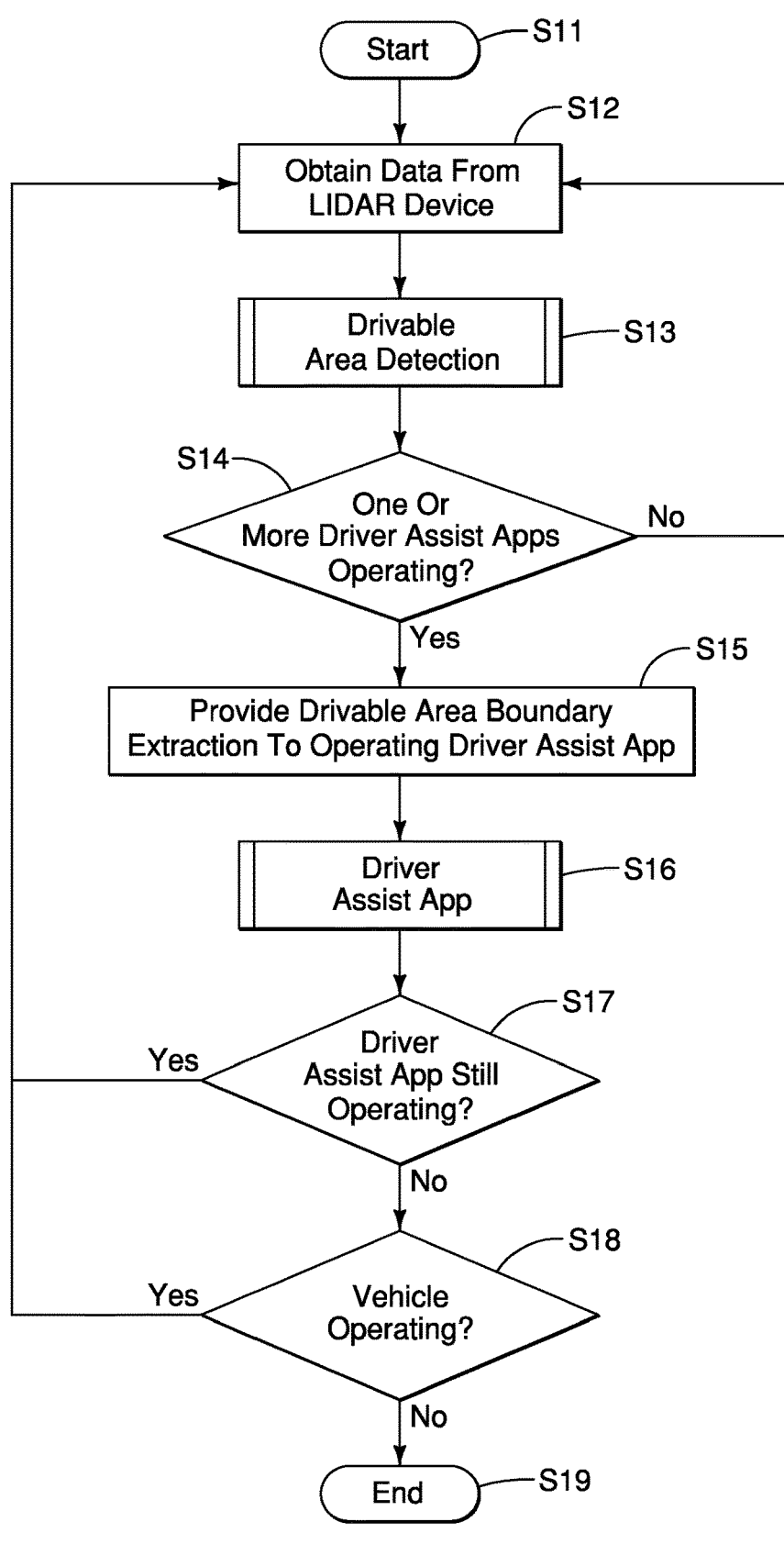
FIG. 2 is a first flowchart showing basic steps conducted by the electronic controller in accordance with the first embodiment.
Figure 4:
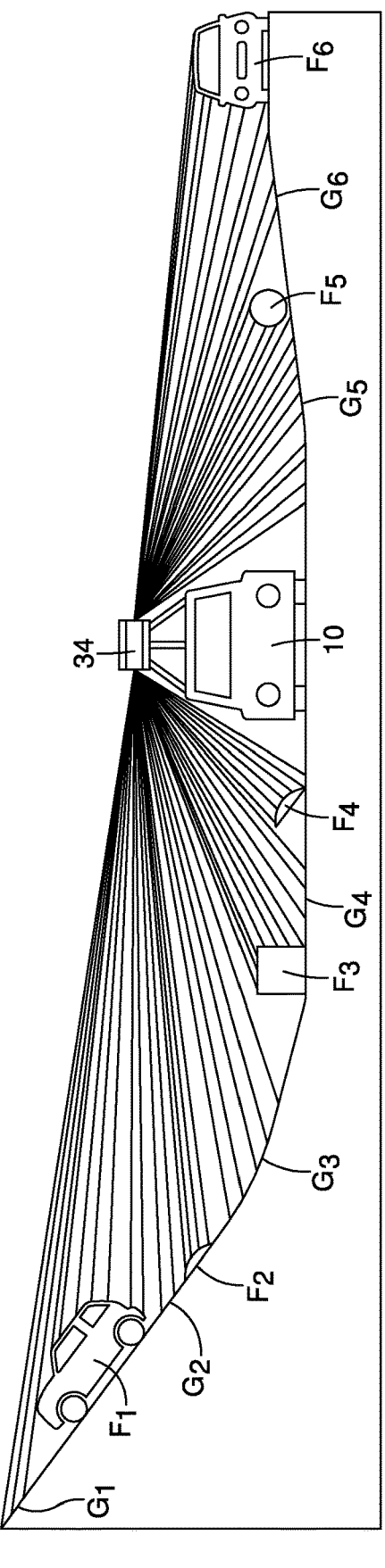
FIG. 4 is a two-dimensional schematic view of the vehicle and the 3D sensor showing various features around the vehicle including objects, obstacles, a curb and ground features showing lines-of-sight from the 3D sensor to surface portions of many the objects, obstacles, a curb and ground features during a scan by the 3D sensor in accordance with the first embodiment.
Figure 5:
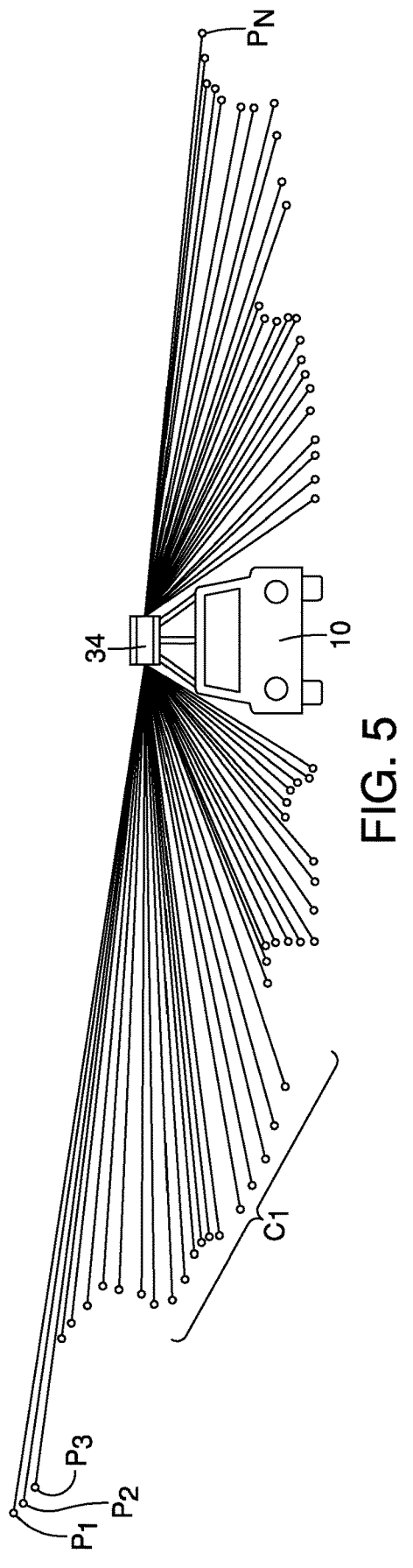
FIG. 5 is another two-dimensional schematic view of the vehicle and the 3D sensor showing data points that define a two-dimensional portion of point cloud where each data point of the point cloud corresponds to light reflections off surface portions of the various features around the vehicle including the objects, obstacles, the curb and some of the ground features in accordance with the first embodiment.
Figures 6, 7:
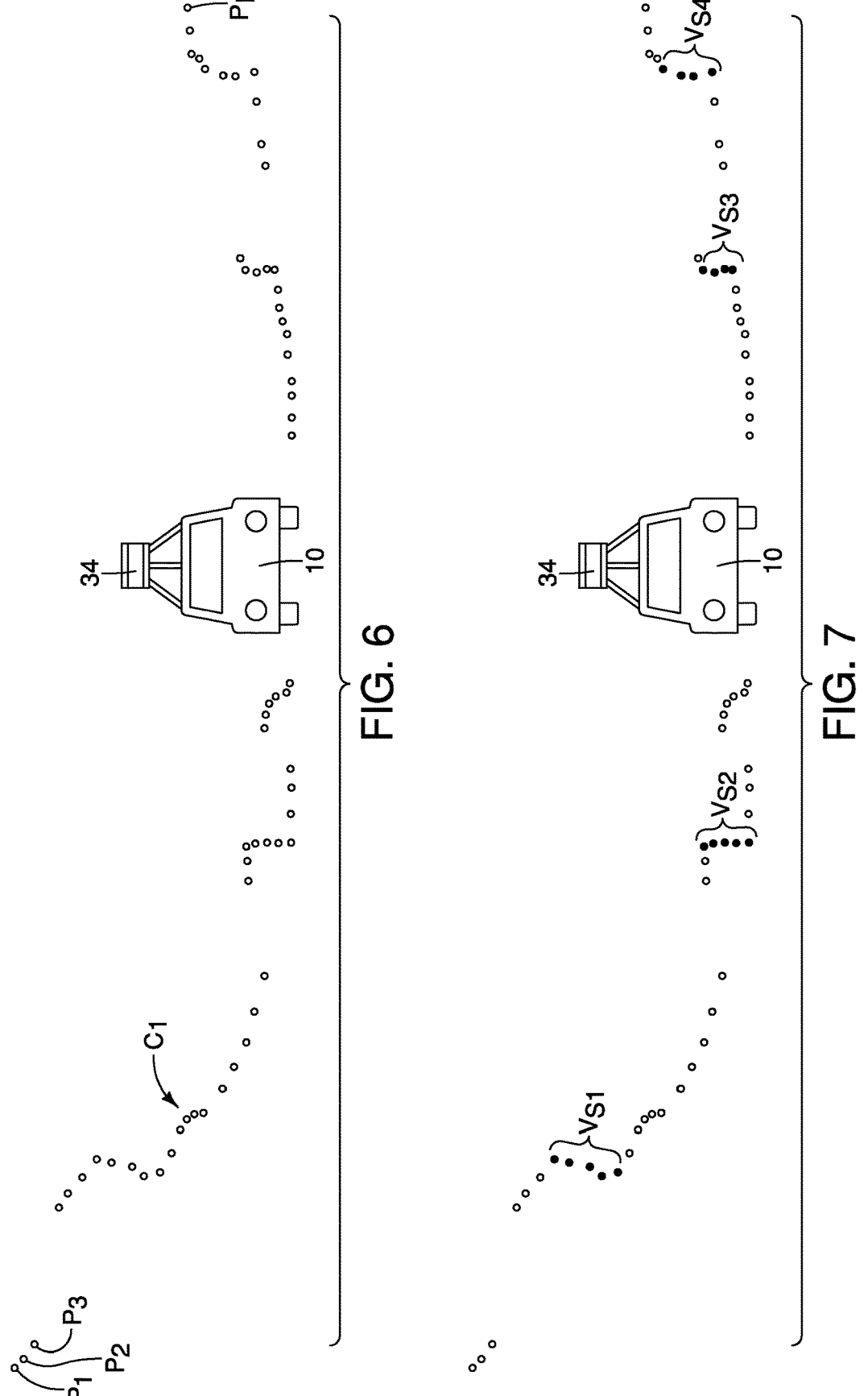
FIG. 6 is another two-dimensional schematic view of the vehicle and the 3D sensor showing the digital data points of the point cloud, each data point corresponding to surface portions of the various features around the vehicle, each digital data point having distance, direction and height information relative to the vehicle of the corresponding surface portion with the first embodiment.
FIG. 7 is still another two-dimensional schematic view of the vehicle and the 3D sensor showing the data points during a first evaluation by the electronic controller where vertical groups of data points are identified, the vertical groups of data points possibly being objects, vehicles, or obstacles around the vehicle in accordance with the first embodiment.

As shown in FIG. 2, when the vehicle 10 is operating, the electronic controller 24 begins operating the first 3D sensor 34 at step 11 such that the first 3D sensor 34 begins collecting data points and assembling point clouds. A two-dimensional depiction of features $F_1$, $F_2$, $F_3$, $F_4$, $F_5$ and $F_6$ and ground portions $G_1$, $G_2$, $G_3$, $G_4$, $G_5$ and $G_6$ around the vehicle 10 is shown in FIG. 4. Lines of sight extending from the first 3D sensor 34 are shown surface portions of each of the features $F_1$, $F_2$, $F_3$, $F_4$, $F_5$ and $F_6$ and each of the ground portions $G_1$, $G_2$, $G_3$, $G_4$, $G_5$ and $G_6$ is also shown representing the scanning and surface detection process of the first 3D sensor 34. FIG. 5 shows a two-dimensional depicted of an example of a point cloud $C_1$ that includes data points detected by the first 3D sensor 34 of surface portions of features $F_1$, $F_2$, $F_3$, $F_4$, $F_5$ and $F_6$ and ground portions $G_1$, $G_2$, $G_3$, $G_4$, $G_5$ and $G_6$ depicted in FIG. 4. FIG. 5 also shows line-of-sight lines from the data points to the 3D sensor 34. In FIG. 6, the line-of-sight lines from the data points to the 3D sensor 34 are removed leaving only the point cloud $C_1$ and the vehicle 10 with the 3D sensor 34.

Figure 19:
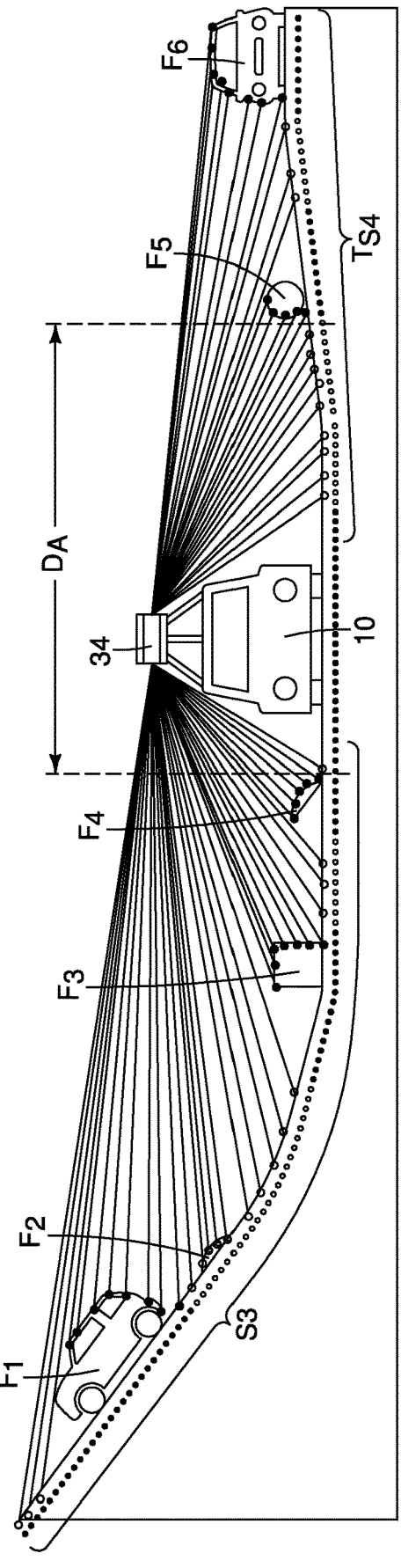
FIG. 19 is a two-dimensional view of the digital data points of the data cloud after evaluation by the electronic controller with the objects and obstacles shown in FIG. 4 superimposed on the digital data points in accordance with the first embodiment.

The data points depicted in FIGS. 5 and 6 represent an example of a portion of a first point cloud $C_1$. Specifically, since FIG. 4 is a two-dimensional representation of areas on either lateral side of the vehicle 10, the data points of those features and ground portions forward of the vehicle 10 are not visible in FIGS. 5-6. However, those features and ground portions forward of the vehicle 10 are scanned generating corresponding data points being generated by the 3D sensor 34, as shown in FIG. 19 and discussed further below. Correspondingly, the two-dimensional representation in FIG. 6 is only shows a sub-set of the data points of the point cloud $C_1$. It should be understood from the drawings and description herein that the partial point cloud $C_1$ depicted in FIGS. 5 and 6 includes additional data points (not shown) that corresponding to surface portions of features, objects and ground portions forward of the vehicle 10 that not visible in FIG. 4.

At step S12 in FIG. 2, the electronic controller 24 receives and loads all the data points that make up the point cloud $C_1$ detected by the first 3D sensor 34. Each data point $P_1$ thru $P_n$ in FIGS. 5 and 6 is based on a reflection of a portion of the surface of one of the features $F_1$, $F_2$, $F_3$, $F_4$, $F_5$ and $F_6$ or an area of one of the ground portions $G_1$, $G_2$, $G_3$, $G_4$, $G_5$ and $G_6$.

Figure 3:
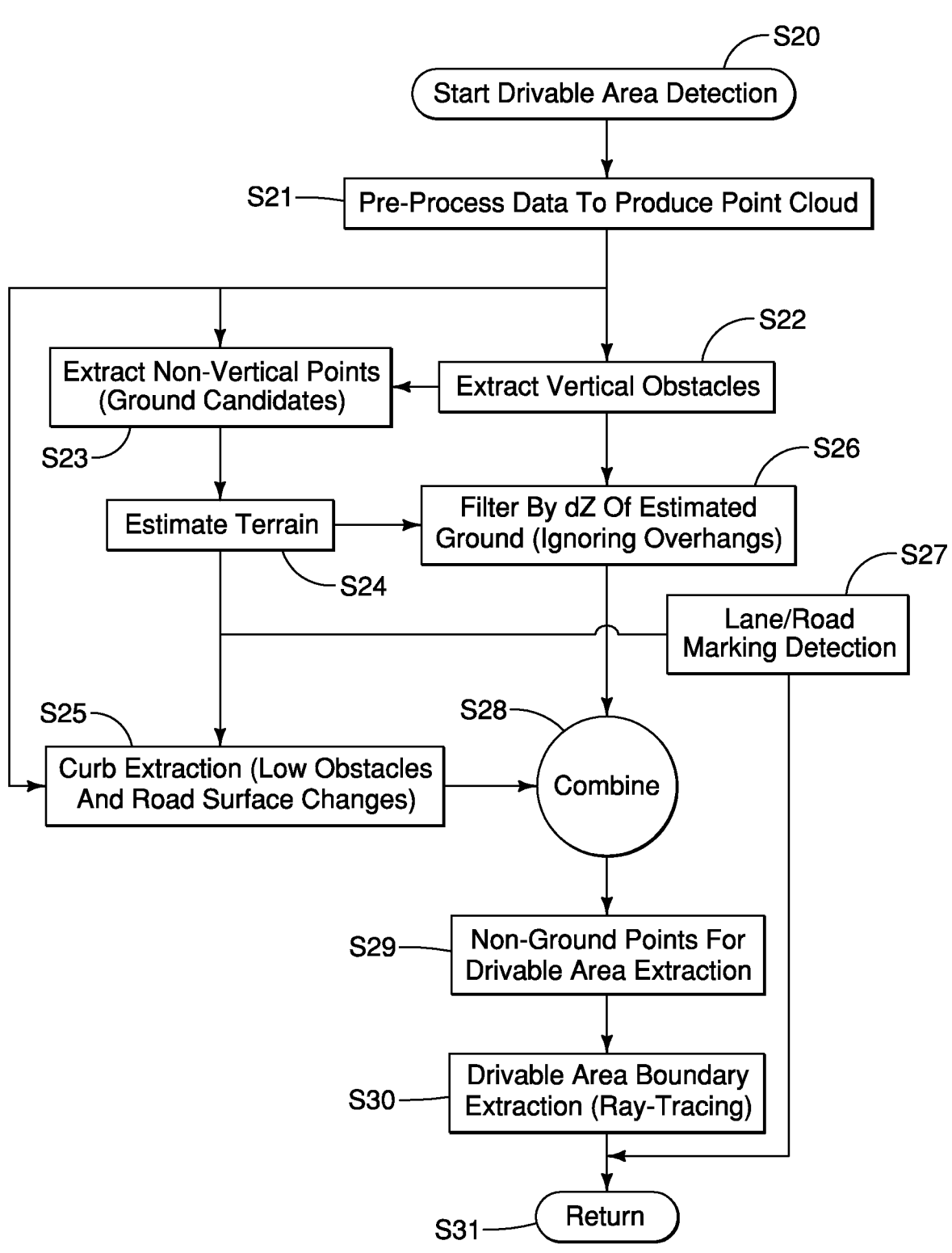
FIG. 3 is a second flowchart showing steps conducted by the electronic controller in the evaluation and extraction of data received from the 3D sensor in accordance with the first embodiment.

At step S13 in FIG. 2, the electronic controller 24 evaluates point cloud after point cloud from the 3D sensor 34 and creates a processed point cloud CP shown in FIG. 16 and described in greater detail below with reference to FIG. 3. The processed point cloud $C_P$ includes data points representing, for example, vertical obstacles and non-vertical obstacles and a drivable area that can define a roadway. The specific operations and evaluations conducted by the electronic controller 24 are depicted in FIG. 3 and are described in greater detail below.

After the processing of step S13 (the steps depicted in FIG. 3), operation moves to step S14. At step S14 in FIG. 2, the electronic controller 24 determines whether or not one of the plurality of driver assist components 26 is being utilized. If not, operation returns to step S12 where each new point cloud from the 3D sensor 34 is evaluated by the electronic controller 24.

Figures 15, 16:
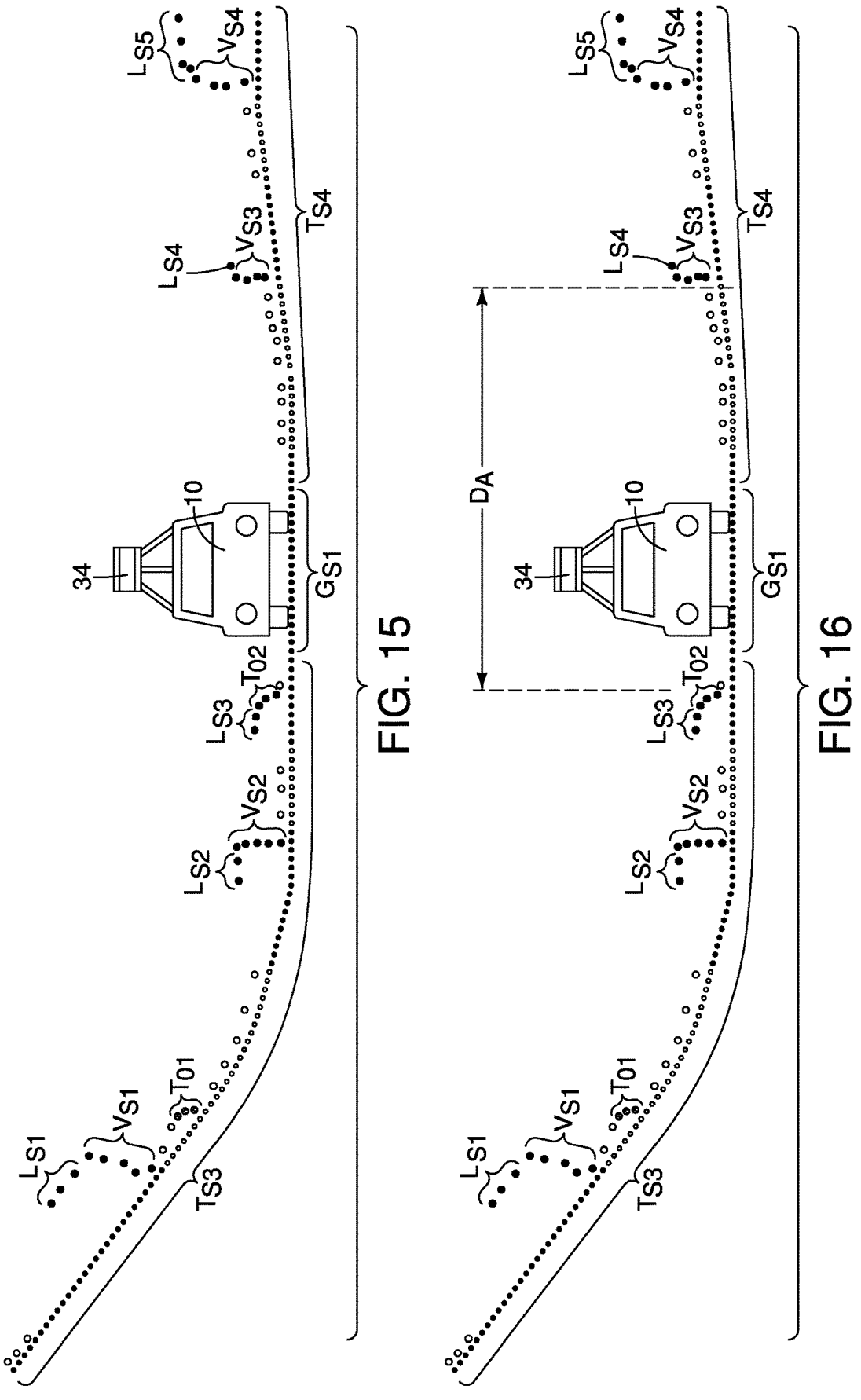
FIG. 15 is two-dimensional schematic view of the vehicle and the 3D sensor showing all groups of digital data points of the point cloud being re-assembled without discarded data points, identifying terrain, a curb and various obstacles and objects surrounding the vehicle in accordance with the first embodiment.
FIG. 16 is a two another two-dimensional schematic view of the vehicle and the 3D sensor showing a drivable area around the vehicle identified by the electronic controller in accordance with the first embodiment.
Figure 17:
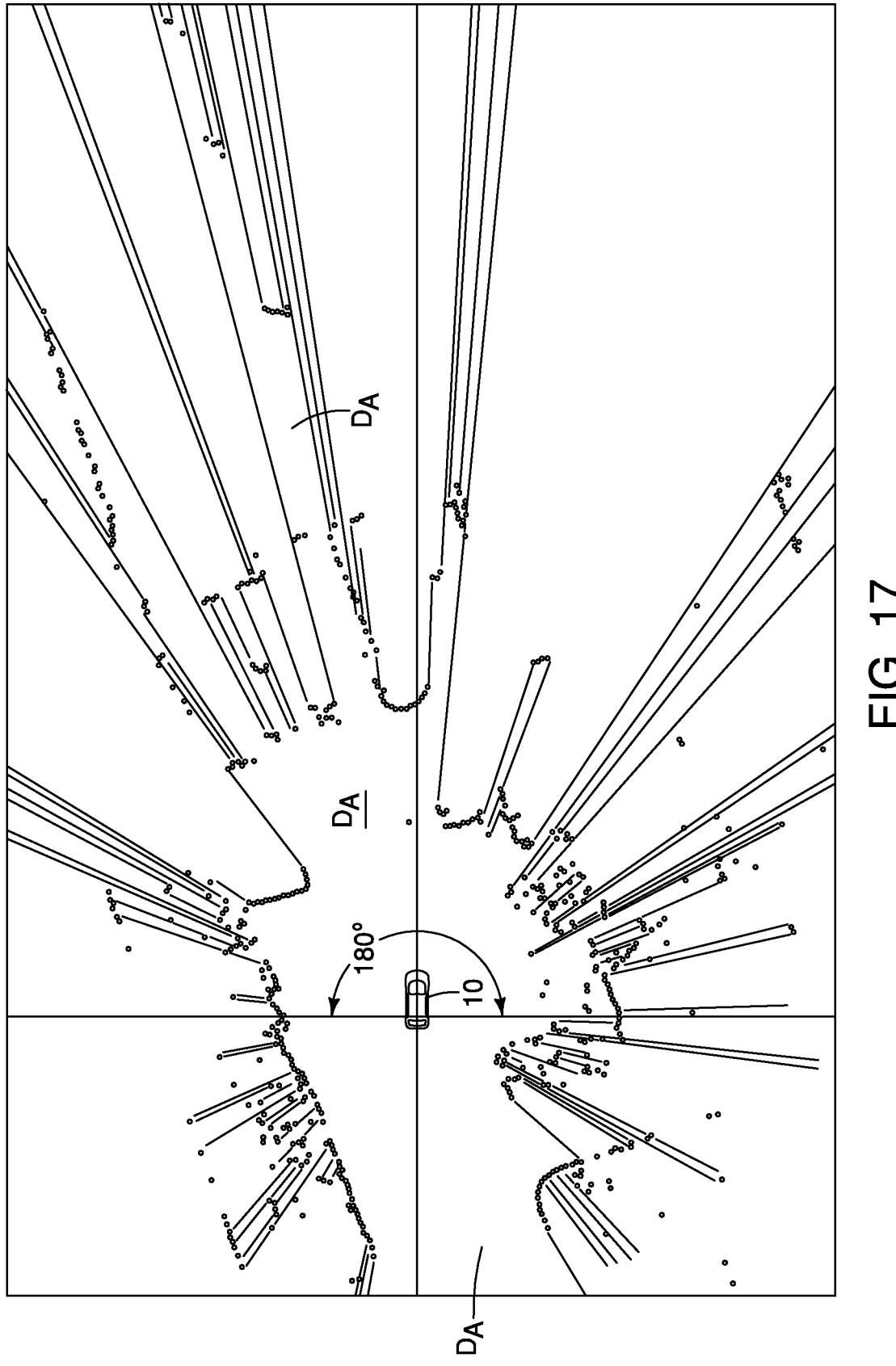
FIG. 17 is an overhead digital view of the evaluated and filtered point cloud showing drivable areas bordered by data points that represent curbs, objects and obstacles that do not define drivable areas in accordance with the first embodiment.

At step S14, if one of the plurality of driver assist components 26 is being utilized, then operation moves to step S15 where the processed point cloud $C_P$ in FIG. 16 is accessed by the one of the plurality of driver assist components 26. At step S16, the one of the plurality of driver assist components 26 is controlled by the electronic controller 24 to conduct operations in accordance with that driver assist component (also referred to as a driver assist app).

The plurality of driver assist components 26 include one or more (or all) of the following: a navigation application 40 (also referred to as a navigation app 40), an obstacle warning application 42 (also referred to as an obstacle warning app 42), a collision avoidance application 44 (also referred to as a collision avoidance application 44), a lane departure application 46 (also referred to as a lane departure app 46) and a parking assistant application 48 (also referred to as a parking assistant application 48).

The navigation app 40 is a conventional application that utilizes information from the GPS 28 (global positioning satellite system) in order to provide a vehicle operator with driving directions/instructions to reach a selected destination. The processed point cloud $C_P$ from the electronic controller 24 can be used by the navigation app 40 to enhance local information regarding road conditions and terrain currently around and/or forward of the vehicle 10.

The obstacle warning app 42 is an application that utilizes data from the sonar/radar sensors 20a and provides warnings to a vehicle operator of obstacles close to the vehicle 10. The obstacle warning app 42 is enhanced by the inclusion of the processed point cloud $C_P$ from the electronic controller 24 providing warnings of upcoming obstacles in the processed point cloud $C_P$ while those obstacles are dozens of yards ahead of the vehicle 10, in addition to warning of obstacles that are close to or very near the vehicle 10.

The collision avoidance app 44 is an application that utilizes data from the sonar/radar sensors 20a and data from the GPS 28 to make steering corrections to avoid objects in the path of the vehicle 10. Specifically, the electronic controller 24 is programmed to operate the steering system 18 to make minor adjustments in the trajectory of the vehicle 10 and/or operate the braking system 14 in order to avoid contact with obstacles in the path of the vehicle 10 with the vehicle 10 in motion. The collision avoidance app 44 is enhanced by the inclusion of the processed point cloud $C_P$ from the electronic controller 24. Specifically, obstacles in the path of the vehicle 10 result in data points appearing in the processed point cloud $C_P$ from the electronic controller 24. Inclusion of these data points in the processed point cloud $C_P$ provide detection of objects that further forward of the vehicle 10 than can be identified by the sonar/radar sensors 20a. Therefore, when the collision avoidance app 44 is provided with data points that correspond to obstacles that are a greater distance away from the vehicle 10 than those identified by sonar/radar sensors 20a and the electronic controller 24 is provided with a greater period of time to decide whether or not to make a steering correction via the steering system 18 and/or operate the braking system 14.

The lane departure app 46 is an application that conventionally relies on camera data to determine locations of lane divider lines on either side of the vehicle 10. At night when it is dark, such camera data can often be of reduced value. Operation of the lane departure app 46 is enhance by use of the processed point cloud $C_P$ because the first 3D sensor 34 can detect lane divider lines and provide line location to the lane departure app 46 regardless of weather or light conditions.

The parking assistant app 48 is an application that can assist or automatically parallel park the vehicle 10 using feedback from the sonar/radar sensors 20a to prevent contact with adjacent vehicles during the parking process. The parking assistant app 48 is enhanced using the processed point cloud $C_P$ from the electronic controller 24. Specifically, the processed point cloud $C_P$ includes data points representing reflections of surfaces of objects that are located above or along side the parking space providing the parking assistant app 48 with an improved 3D representation of areas around the vehicle 10, around the parking space and within the parking space.

After step S16, the electronic controller 24 proceeds to step S17 in FIG. 2. At step S17 a decision is made by the electronic controller 24 whether or not the driver assist apps 26 have completed their respective operation(s). If one or more of the apps is still operating, operation returns to step S12 for continuing evaluation of newly collected point clouds with the vehicle 10 in motion.

At step S17, if the apps have completed their operation(s), the electronic controller 24 proceeds to step S18. At step S18, if the vehicle 10 is still operating, operation returns to step S12 for continuing evaluation of newly collected point clouds with the vehicle 10 in motion.

At step S18, if the vehicle 10 has ceased operating, the electronic controller 24 ceases operation at step S19.

Returning now to step S13 in FIG. 2, the electronic controller 24 conducts the processes and steps depicted in FIG. 3 in the evaluation of data points in the point cloud accumulated by operation of the first 3D sensor 34.

As step S20 in FIG. 3, the electronic controller 24 starts evaluating point data to ultimately determine a drivable area in areas around the vehicle 10 (drivable area detection). At step S21, the electronic controller 24 pre-processes the most recently assembled point cloud $C_1$. As described above, the first 3D sensor 34 (a LIDAR device) collects data points that are locations of reflections from surfaces of objects and surfaces adjacent to and forward of the vehicle 10. Each of these data points include direction to the surface (point of reflection), vertical height of the surface and distance to the surface of the point of reflection on the object or obstacle.

At step S21, depending on the type of 3D sensor being employed, the data points $P_1$ thru $P_n$ are pre-processed to properly format the point cloud $C_1$ with the data corresponding to each data point being organized and arranging in the point cloud $C_1$ such that the electronic controller 24 can more advantageously evaluate the data points. Specifically, for each data point $P_1$ thru $P_n$ (FIG. 6) representing a reflection of surface portions of features $F_1$, $F_2$, $F_3$, $F_4$, $F_5$ and $F_6$ and ground portions $G_1$, $G_2$, $G_3$, $G_4$, $G_5$ and $G_6$ as shown in FIGS. 4 and 5 is converted into the point cloud $C_1$ that is partially shown in FIG. 6. Each data point $P_1$ thru $P_n$ has distance, direction and vertical height and is properly arranged for evaluation and processing by the electronic controller 24.

Next the point cloud $C_1$ shown in FIG. 6 is evaluated using concurrent processing paths. A first processing path shown in FIG. 3 at step S22 evaluates the data points in the point cloud $C_1$ and identifies and extracts data points that represent vertical obstacles where groups of data points are stacked one on top of another. Several sub-sets of data points that are arranged in an upright or vertical manner are recognized as defining upright or vertical subsets $V_{S1}$, $V_{S2}$, $V_{S3}$ and $V_{S4}$, as shown in FIG. 7. Evaluating the data point $P_1$ thru $P_n$ in this step is based on a vertical geometric analysis in that obviously vertical sets of points are identified. The upright or vertical subsets $V_{S1}$, $V_{S2}$, $V_{S3}$ and $V_{S4}$ are assumed to be non-drivable areas, objects or obstacles that pose a danger for the vehicle 10, if driven over, or driven near these objects or obstacles. For example, the upright or vertical subsets $V_{S1}$, $V_{S2}$, $V_{S3}$ and $V_{S4}$ are assumed to be the sides of cars, sides of buildings, sides of barriers, side of a box on the road, etc. Thus, the upright or vertical subsets $V_{S1}$, $V_{S2}$, $V_{S3}$ and $V_{S4}$ of data points are designated as non-drivable features.

At step S23, non-vertical data points are extracted and designated as possible ground features, ground candidates and/or a drivable area $D_A$ (described further below). The extraction of non-vertical data points of step S23 can be a separate step from step S22. Alternatively, the extraction of non-vertical data points can be a result of the removal of upright or vertical subsets $V_{S1}$, $V_{S2}$, $V_{S3}$ and $V_{S4}$ identified in Step S22 from the point cloud $C_1$. Either way, the remaining data points after step S23 define terrain subsets $T_{S1}$ and $T_{S2}$ of data points shown in FIG. 8 (a group of data points that represent non-vertical data points from the point cloud $C_1$).

Figures 10, 11, 12:
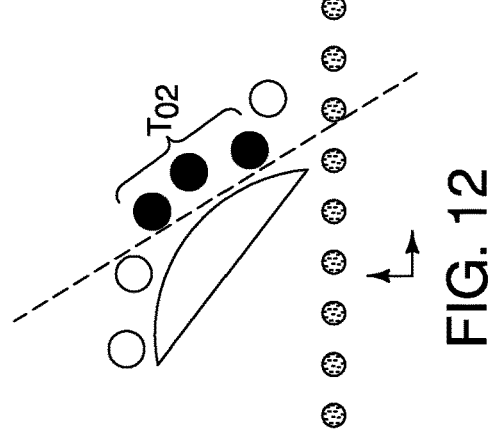
FIG. 10 is another two-dimensional schematic view of the vehicle and the 3D sensor showing elevated groups of elevated non-linear data points being identified by the electronic controller in accordance with the first embodiment.
FIG. 11 is a schematic view of a first group of elevated non-linear data points being evaluated by the electronic controller using a line normal to the terrain beneath the first group of elevated non-linear data points identifying the first group as a non-curb limiting features, such as a speed bump, in accordance with the first embodiment.
FIG. 12 is a schematic view of a second group of elevated non-linear data points being evaluated by the electronic controller using a line normal to the terrain beneath the second group of elevated non-linear data points identifying the second group as a curb and is defined as a non-drivable area in accordance with the first embodiment.

In step S24, ground data points $G_{S1}$ located beneath the vehicle 10 and shown in FIG. 8 are assumed by the electronic controller 24 to be actual ground points, since the vehicle 10 is in contact with the ground beneath itself. Further, in step S24, using the terrain subsets $T_{S1}$ and $T_{S2}$, the electronic controller 24 extrapolates from the ground data points $G_{S1}$ to the various portions of the terrain subsets $T_{S1}$ and $T_{S2}$ and estimates the actual overall shape and contour of the terrain $T_{S3}$ on one side of the vehicle, and the terrain $T_{S4}$ on an opposite side of the vehicle 10, as shown in FIG. 9. The estimating of terrains $T_{S3}$ and $T_{S4}$ includes a geometric analysis whereby groups of data points in the estimated subsets of terrains $T_{S3}$ and $T_{S4}$ (terrain data), are evaluated by taking lines $N_1$, $N_2$ thru $N_N$ normal to smaller groups of the data points of terrains $T_{S3}$ and $T_{S4}$ thereby determining the overall slope of the actual terrain, as shown in FIG. 10. Thus, as step S24, the electronic controller 24 evaluates the group of data points (subsets $T_{S1}$ and $T_{S2}$) extracted from the point cloud $C_1$ and generates an estimate of terrain proximate the vehicle (terrains $T_{S3}$ and $T_{S4}$) including the drivable area $D_A$ (FIG. 16). The group of data points (subsets $T_{S1}$ and $T_{S2}$) are evaluated by gridding the non-vertical data points and fitting planes to groups of the lowest points in the group of data points (subsets $T_{S1}$ and $T_{S2}$).

At step S25, the electronic controller 24 is further configured to identify curb points. One method includes evaluating the group of data points of terrains $T_{S3}$ and $T_{S4}$ representing the estimate of terrain and identify one or more vertical obstacles including one or more curbs along the drivable area $D_A$. Specifically, groups of data points such as groups $T_{O1}$ and $T_{O2}$ of the data points of terrains $T_{S1}$ and $T_{S2}$ appear to be outliers when compared to the data points of terrains $T_{S3}$ and $T_{S4}$. These groups $T_{O1}$ and $T_{O2}$ of the data points are close to the height of the estimated ground surfaces (the data points of terrains $T_{S3}$ and $T_{S4}$) but are stacked somewhat vertically with respect to the slope of the estimated ground surfaces (terrains $T_{S3}$ and $T_{S4}$) calculated in the previous step. The electronic controller identifies data points such as groups $T_{O1}$ and $T_{O2}$ as not being high enough or vertical enough to be caught in step S22 but are still hazardous for the vehicle 10 to drive into/over. These two sets of data points groups $T_{O1}$ and $T_{O2}$ corresponding to a bump-shape are not quite vertical (and thus were not removed in the step S22), but, are close to the estimated ground surface (terrains $T_{S3}$ and $T_{S4}$ and stacked somewhat vertically. Therefore, the electronic controller 24 evaluates these data points, as shown in FIGS. 11 and 12 to determine whether or not they are surfaces of a curb bordering the drivable area $D_A$.

Even though these two groups of data points (groups $T_{O1}$ and $T_{O2}$) represent reflections off of the same object (features $F_2$ and $F_5$ respectively in FIG. 4), the angle that the group $T_{O2}$ forms with respect to the sloped ground plane underneath it is larger than the angle that the group $T_{O1}$ forms with respect to the flat ground plane.

Thus, the group $T_{O1}$ is not considered a curb point, while the group $T_{O2}$ is a considered a curb point. However, the electronic controller 24 determines that the group $T_{O1}$ can be noted as a drivable-but is possibly a speed-bump since it still forms a small angle with respect to the ground plane, the angle in FIG. 11 being less than, for example, 35 degrees.

Figures 13, 14:
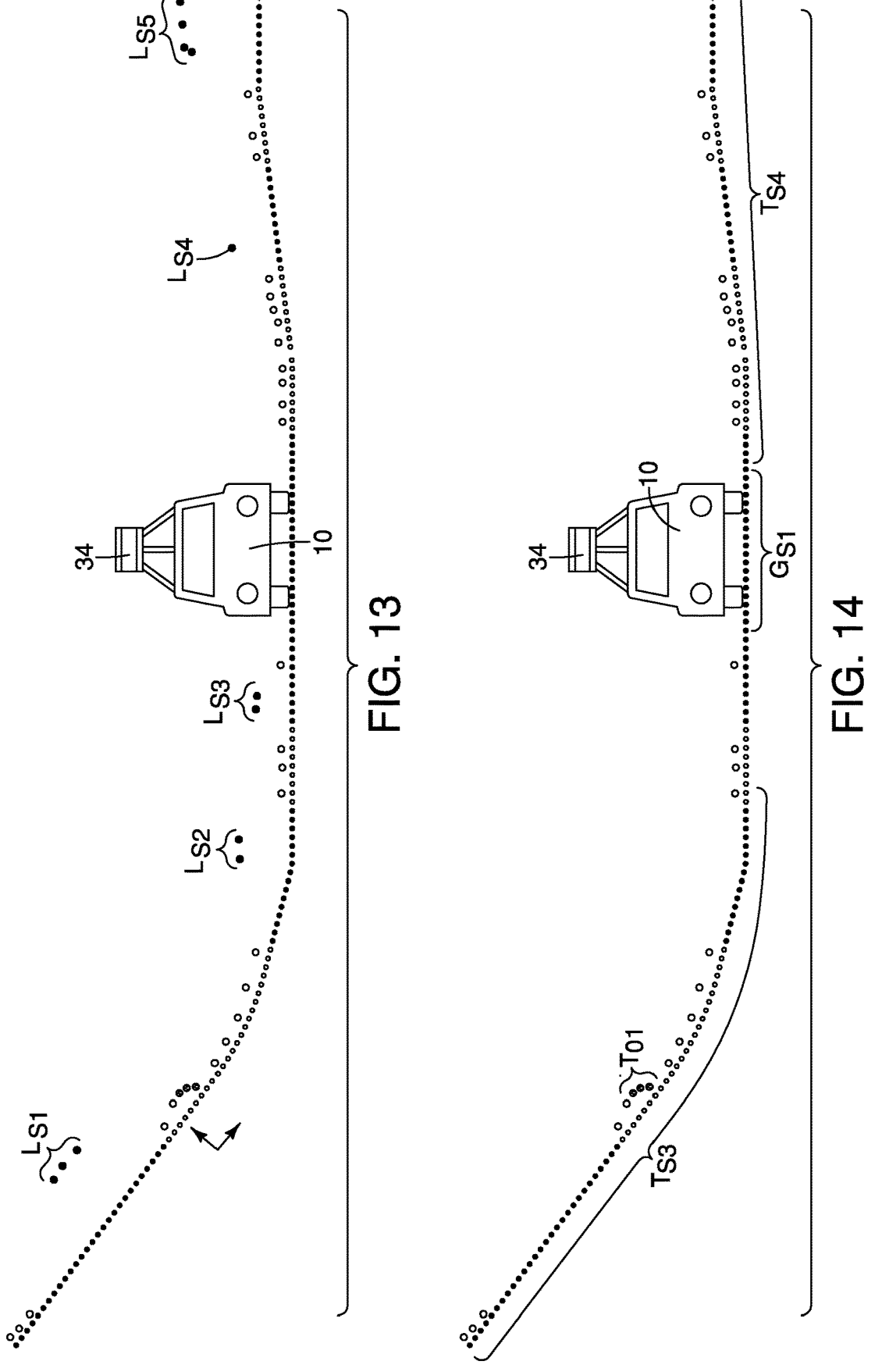
FIG. 13 is another two-dimensional schematic view of the vehicle and the 3D sensor showing elevated groups of elevated linear data points being identified by the electronic controller as upper surfaces of corresponding objects or obstacles defining corresponding non-drivable areas in accordance with the first embodiment.
FIG. 14 is two-dimensional schematic view of the vehicle and the 3D sensor showing digital data points of the point cloud identifying terrain around the vehicle with the elevated groups of linear data points removed in accordance with the first embodiment.

At step S26, the electronic controller 24 is further configured to data points by filtering out those portions of the second group of data points that are above a predetermined height relative to the vehicle and the estimate of the terrain in the absence of data points below these data points. Such data points are considered to be, for example, limbs of trees hanging down or other such structures that are too high to interfere with driving of the vehicle 10 and therefore are not obstructions or obstacles. Further, the electronic controller 24 identifies groups of linear groups of data points such as groups $L_{S1}$, $L_{S2}$, $L_{S3}$, $L_{S4}$ and $L_{S5}$. These data point groups $L_{S1}$, $L_{S2}$, $L_{S3}$, $L_{S4}$ and $L_{S5}$ are at respective levels above the terrain $T_{S3}$ and $T_{S4}$ such that they are considered to be upper surfaces of obstacles and are extracted from the terrains $T_{S3}$ and $T_{S4}$. Thus, as shown in FIG. 14, the terrains $T_{S3}$ and $T_{S4}$ along with data points group $T_{O1}$ show a digital representation of the ground or terrain around the vehicle 10.

At step S27 lane or road markings can be detected along the terrains $T_{S3}$ and $T_{S4}$ and used accordingly, if desired.

At step S28, the various groups of data points extracted in the steps above that were not discarded or ignored are combined together to form a digital rendering of the areas around the vehicle 10, as shown in FIG. 15. Specifically, the ground data points $G_{S1}$, the ground data points in groups terrain $T_{S3}$ and $T_{S4}$, vertical data groups $V_{S1}$, $V_{S2}$, $V_{S3}$ and $V_{S4}$, linear data point groups $L_{S1}$, $L_{S2}$, $L_{S3}$, $L_{S4}$ and $L_{S5}$, curb data points of group $T_{O1}$ and object data points group Toe are all combined in a single digital data point set.

Next at step S29, the electronic controller 24 evaluates drivable areas (areas without obstructions or obstacles) of the ground data points $G_{S1}$ and the terrain $T_{S3}$ and $T_{S4}$ as compared to all of the data groups shown in FIG. 15. As a result, at step S30, the drivable area $D_A$ is identified between the obstacle $F_4$ represented by the data points of group $T_{O2}$ and the obstacle $F_5$ represented by data points of group $V_{S3}$, as shown in FIG. 16.

At step S31, operation returns to the flowchart in FIG. 2 to step S14.

As should be understood from the above description, the data points of the processed point cloud depicted in FIGS. 16-19 is prepared only by conducting geometric evaluations of relationships of groups of data points in the original point cloud $C_1$. The vehicle drivable area detection system 12 evaluates the point cloud $C_1$ without object recognition applications or processing.

The above described extractions of data points from the point cloud $C_1$ include:

1) Vertical obstacle extraction, which is one of the steps in processing 3D sensor data using geometric methods. Essentially, this represents an unambiguous triage stage where easy to identify features like vertical surfaces, poles, walls, other road users, etc., are identified and removed from the point cloud $C_1$. The algorithm proceeds simply by comparing nearby points in the 3D point cloud $C_1$ and detecting points that are stacked above each other.

2) Terrain estimating which includes identifying local ground planes in the remaining data by gridding the non-vertical points and fitting planes to the lowest points in a given cell (sub-sets of data points that are near one another).

3) Curb detection that includes comparing the data points that make up the terrain estimating, deviations from the ground plane are detected where these deviations represent curbs or speed bumps.

4) Packaging: Finally, we do a ray tracing approach to find the nearest relevant feature or features in the vicinity of the vehicle. This step can reduce potentially 100 k+ points to 100's for efficient electronic transmission within the vehicle 10.

1. By detecting non-drivable and limited-drivable features using geometric methods, we can guarantee reliable detection in scenes across the globe. The algorithm does not need to be trained to detect baseball gloves, curbs, dogs, potted plants, etc or any of the myriad of potential non-drivable or limited-drivable things that may be on the road.

2. The algorithms are not specific to HD Lidar data but could also be applied to stereo camera disparity maps or other 3D sensors.

3. By taking advantage of the centimeter-accurate 3D sensing provided by Lidar, the system can reliably detect obstacles which may otherwise be indistinguishable for a camera/radar system.

Alternatively, the 3D sensor 34 described above can be any of a variety of stereo cameras that can provide direction, vertical height and parallax that yields distance measurements. Stereo cameras can also be used to estimate 3D surfaces. More specifically, the 3D sensor 34 can be any type of stereo camera outputs, high resolution radar outputs, and any other sensor that can produce accurate 3D point clouds of the environment. Basically any 3D sensor can be used as an input to the above described system.

Further, in an alternative embodiment, the output (the processed point cloud) can be used to annotate the Around-view-monitor available in many vehicles.

The various structural vehicle features and vehicle components are conventional components that are well known in the art. Since such structural vehicle features and vehicle components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the drivable area detection system. Accordingly, these terms, as utilized to describe the present invention should be interpreted relative to a vehicle equipped with the drivable area detection system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle drivable area detection system, comprising:
a vehicle;
at least one 3D sensor installed to the vehicle and being configured to scan and capture data using laser imaging, detection and distance ranging relative to the vehicle, the data representing ground surface features including vertical obstacles, non-vertical obstacles and a drivable area proximate the vehicle within a line-of-sight of the 3D sensor; and an electronic controller installed within the vehicle and electronically connected to the 3D sensor and at least one driver assist component, the electronic controller configured to: (i) retrieve a plurality of data points for an area of the vehicle; (ii) identify one or more vertical obstacles where groups of the data points are stacked vertically; (iii) filter out groups of the data points that are stacked vertically above a predetermined height; (iv) estimate terrain in absence of data points below the filtered groups of data points that are stacked vertically above the predetermined height; (v) determine one or more curbs within the terrain; and (vi) generate a plurality of data elements identifying the drivable area from at least the estimated terrain and the one or more curbs for the at least one driver assist component.

2. The vehicle drivable area detection system according to claim 1, wherein
the electronic controller is configured to evaluate the data from the 3D sensor and create a point cloud that includes data points representing vertical obstacles and non-vertical obstacles.

3. The vehicle drivable area detection system according to claim 2, wherein
the electronic controller is further configured to extract a first group of data points that represent non-vertical data points from the point cloud, and evaluate the first group of data points extracted from the point cloud to generate an estimate of terrain proximate the vehicle, the first group of data points being evaluated by gridding the non-vertical data points and fitting planes to groups of lowest points in the first group of data points.

4. The vehicle drivable area detection system according to claim 3, wherein
the electronic controller is further configured to compare the point cloud and the first group of data points representing the estimate of terrain and identify one or more vertical obstacles including the one or more curbs along the drivable area.

5. The vehicle drivable area detection system according to claim 4, wherein
the electronic controller is further configured to identify a second group of data points from the point cloud, where portions of the second group of data points are located directly above one another, each portion of the second group representing a vertical obstacle, extract the second group of data points from the point cloud, and further evaluate the second group of data points by filtering out those portions of the second group of data points that are above the predetermined height relative to the vehicle and the estimate of the terrain thereby generating a third group of data points.

6. The vehicle drivable area detection system according to claim 5, wherein
the electronic controller is further configured to combine the first group of data points including identification of the one or more curbs and the third group of data points thereby generating a fourth group of data points that define boundaries of the drivable area proximate the vehicle.

7. The vehicle drivable area detection system according to claim 6, wherein
the at least one driver assist component includes one or more of the following: a navigation app, an obstacle warning app, a collision avoidance app, a lane departure app or a parking assistant app.

8. The vehicle drivable area detection system according to claim 1, wherein the at least one driver assist component includes one or more of the following: a navigation app, an obstacle warning app, a collision avoidance app, a lane departure app or a parking assistant app.

9. The vehicle drivable area detection system according to claim 1, wherein
the 3D sensor includes a LIDAR device positioned to scan areas forward and along lateral sides of the vehicle.

10. The vehicle drivable area detection system according to claim 9, wherein
the 3D sensor further includes a second LIDAR device positioned on the vehicle to scan areas rearward of the vehicle and scan areas that are along rearward lateral sides of the vehicle.

11. A method for detecting a vehicle drivable area, comprising:
scanning areas forward and along lateral sides of a vehicle using at least one 3D sensor thereby generating data;
pre-processing the data to produce a point cloud having a plurality of data points representing features scanned by the 3D sensor;
identifying one or more vertical obstacles where groups of the data points are stacked vertically:
filtering out groups of the data points that are stacked vertically above a predetermined height;
estimating terrain in the absence of data points below the filtered groups of data points that are stacked vertically above the predetermined height;
determining one or more curbs within the terrain;
evaluating the estimated terrain and the one or more curbs to determine a drivable area forward of the vehicle; and
providing the drivable area to at least one driver assist component for driving related actions in accordance with the at least one driver assist component.

12. The method for detecting a vehicle drivable area according to claim 11, comprising
gridding non-vertical data points and fitting planes to groups of lowest points of the non-vertical data points to generate a first group of data points.

13. The method for detecting a vehicle drivable area according to claim 12, wherein
the estimating of the terrain from the point cloud includes evaluating the first group of data points extracted from the point cloud to generate an estimate of the terrain proximate the vehicle.

14. The method for detecting a vehicle drivable area according to claim 13, wherein
the determining the one or more curbs from the point cloud includes comparing the point cloud and the first group of data points and identifying one or more vertical obstacles including one or more curbs along the drivable area.

15. The method for detecting a vehicle drivable area according to claim 14, wherein
the evaluating the estimated terrain and the one or more curbs to determine the drivable area forward of the vehicle includes identifying a second group of data points from the point cloud, where portions of the second group of data points are located directly above one another, each portion of the second group representing a vertical obstacle, extracting the second group of data points from the point cloud, and evaluating the second group of data points by filtering out those portions of the second group of data points that are above the predetermined height relative to the vehicle and the estimate of the terrain thereby generating a third group of data points.

16. The method for detecting a vehicle drivable area according to claim 15, comprising combining the first group of data points including identification of the one or more curbs and the third group of data points thereby generating a fourth group of data points that define boundaries of the drivable area proximate the vehicle.

* * * * *